United States Patent
Chiu

(10) Patent No.: US 8,135,512 B2
(45) Date of Patent: Mar. 13, 2012

(54) AUXILIARY CONTROL SYSTEM AND METHOD TO A MOTOR VEHICLE'S BUILT-IN ANTI-THEFT SYSTEM

(75) Inventor: Pei-Cheng Chiu, Kaohsiung (TW)

(73) Assignee: Mei Hwa Technology Corp., Kaohsiung (TW)

( * ) Notice: Subject to any disclaimer, the term of this patent is extended or adjusted under 35 U.S.C. 154(b) by 457 days.

(21) Appl. No.: 12/491,260

(22) Filed: Jun. 25, 2009

(65) Prior Publication Data

US 2010/0332084 A1 Dec. 30, 2010

(51) Int. Cl.
*B60R 25/00* (2006.01)

(52) U.S. Cl. .............. 701/36; 340/426.1; 340/426.17; 307/10.2

(58) Field of Classification Search ............. 701/1, 36, 701/45; 340/426.1, 426.11, 426.16, 426.17, 340/541, 572.1; 307/10.2, 10.5
See application file for complete search history.

(56) References Cited

U.S. PATENT DOCUMENTS

| | | | | |
|---|---|---|---|---|
| 4,811,013 A | * | 3/1989 | Akutsu | 340/5.54 |
| 4,835,407 A | * | 5/1989 | Kataoka et al. | 307/10.5 |
| 4,965,460 A | * | 10/1990 | Tanaka et al. | 307/10.2 |
| 5,079,435 A | * | 1/1992 | Tanaka | 307/10.2 |
| 6,144,114 A | * | 11/2000 | Chutorash | 307/10.5 |
| 6,580,181 B2 | * | 6/2003 | Nagoya et al. | 307/10.5 |
| 6,798,339 B2 | * | 9/2004 | Thompson | 340/426.28 |
| 7,227,447 B2 | * | 6/2007 | Ohtaki et al. | 340/5.62 |
| 7,532,107 B2 | * | 5/2009 | Hara et al. | 340/426.1 |
| 2004/0061597 A1 | * | 4/2004 | Thompson | 340/426.28 |

* cited by examiner

*Primary Examiner* — Paul N Dickson
*Assistant Examiner* — Timothy Wilhelm
(74) *Attorney, Agent, or Firm* — Leong C. Lei

(57) ABSTRACT

The auxiliary control system contains at least a first interaction device and a second interaction device that are capable of mutually detecting the presence of each other by a wireless means. The first interaction device is carried by a driver of a motor vehicle having a built-in anti-theft system, and the second interaction device is tapped into a Main Body ECU in parallel with the original control interface of the built-in anti-theft system. As such, when the driver carrying the first interaction device enters into or moves out of an effective sensing range from the motor vehicle, the second interaction device would detect the presence or absence of the first interaction device. The second interaction device then issues appropriate deactivating or activating signals to the Main Body ECU which in turn disarms or arms the various anti-theft means of the motor vehicle.

4 Claims, 2 Drawing Sheets

AUXILIARY CONTROL SYSTEM AND METHOD TO A MOTOR VEHICLE'S BUILT-IN ANTI-THEFT SYSTEM

(a) TECHNICAL FIELD OF THE INVENTION

The present invention generally relates to anti-theft devices or systems of motor vehicles, and especially relates to an auxiliary control system and a related method to a motor vehicle already having a built-in anti-theft system.

(b) DESCRIPTION OF THE PRIOR ART

Recently, most motor vehicles fresh from the factory are already equipped with some built-in anti-theft system. For example, as shown in FIG. 1, the built-in anti-theft system 1 mainly contains a wireless transmitter 11 and a wireless receiver 12. The wireless transmitter 11 radiates wireless signals. Upon receiving a wireless signal from the wireless transmitter 11, the wireless receiver 12 sends instructions via wire lines to a vehicle-mounted computer (usually referred to as Main Body ECU) 13. The computer 13 then controls the various anti-theft means 14 on the motor vehicle, such as disrupting the oil or electricity supply, locking the vehicle doors, etc.

To use the anti-theft system 1, a driver usually operates the wireless transmitter 11 within a distance from the motor vehicle to arm or disarm the anti-theft system 1 after exiting or before entering the motor vehicle. However, over a period of time and after repeated usage of the wireless transmitter 11, the wireless transmitter 11 usually suffers various malfunctions from its mechanical or electrical parts. As such, the present inventor has disclosed a number of teachings to overcome the aforementioned problem and to extend the operational life of the wireless transmitter in Taiwan Patent Nos. I236988 and I298301. In the present invention, an auxiliary non-intrusive method and device are provided to further enhance the built-in anti-theft system of a motor vehicle.

SUMMARY OF THE INVENTION

The invention provides an auxiliary control system to a motor vehicle's built-in anti-theft system in a non-intrusive manner. The auxiliary control system involves an automatic sensing means and, therefore, there is no need to worry about the wearing off or malfunction from the original wireless transmitter of the built-in anti-theft system.

The auxiliary control system of the present invention contains at least a first interaction device and a second interaction device that are capable of mutually detecting the presence of each other. The first interaction device is carried by a driver of the motor vehicle and the second interaction device is installed inside the motor vehicle. The second interaction device is connected to a Main Body ECU in parallel with a wireless receiver of the built-in anti-theft system. The second interaction device is able to issue signals to the Main Body ECU in a manner identical to those from the wireless receiver.

The mutual detection between the first and second interaction devices is achieved by a wireless means. As such, when the driver carrying the first interaction device enters into or moves out of an effective sensing range from the motor vehicle, the second interaction device would detect the presence or absence of the first interaction device. The second interaction device then issues appropriate deactivating or activating signals to the Main Body ECU which in turn disarms or arms the various anti-theft means of the motor vehicle.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
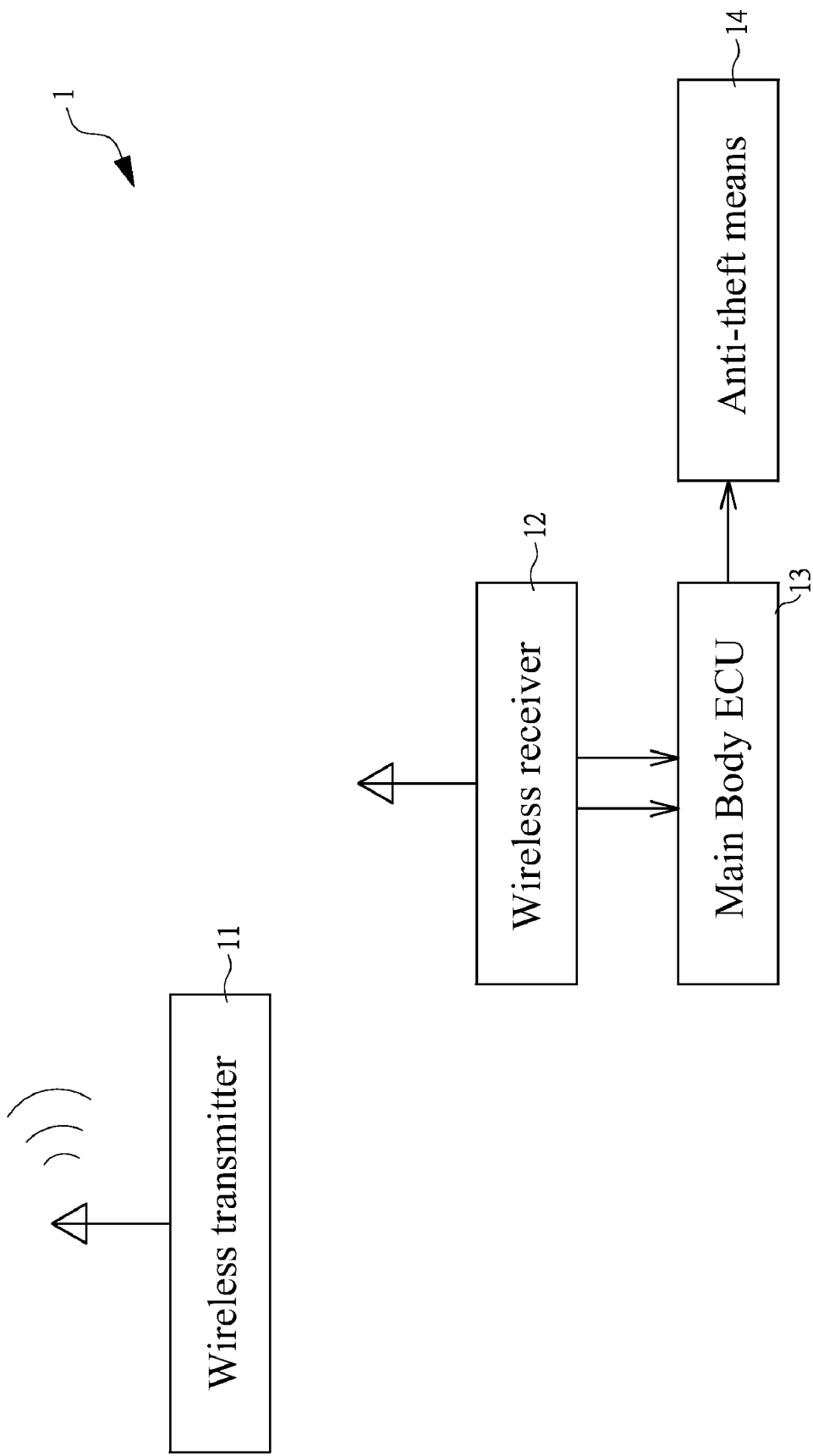
FIG. 1 is a block diagram showing the various functional blocks of a motor vehicle built-in anti-theft system of a prior art.
Figure 2:
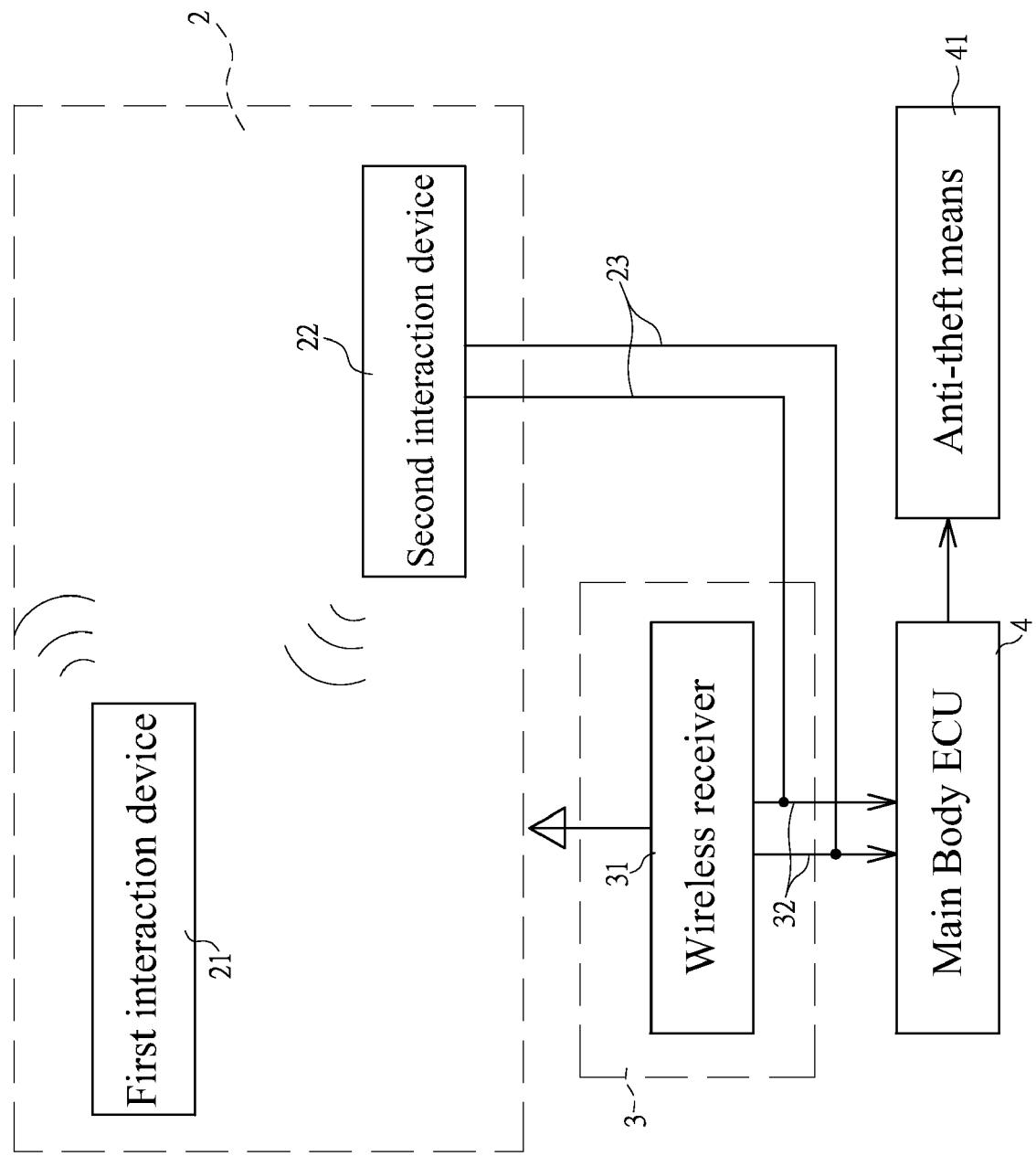
FIG. 2 is a block diagram showing the various functional blocks of a motor vehicle anti-theft system according to an embodiment of the present invention.

As illustrated in FIG. 2, the present invention is for a motor vehicle that already has a built-in anti-theft system. The invention provides at least a control system 2 which in turn contains at least a first interaction device 21 and a second interaction device 22 that are capable of mutually detecting the presence of each other. The first interaction device 21 is carried by a driver of the motor vehicle and preferably is integrated in the vehicle key. The second interaction device 22 is installed inside the motor vehicle. The mutual detection between the first and second interaction devices 21 and 22 is achieved by a wireless means and, more specifically, by a Radio Frequency Identity (RFID) means.

A wireless receiver 31 of the motor vehicle's built-in anti-theft system 3 is connected to a Main Body ECU 4 via signal wires 32 and the Main Body ECU 4 is capable of activating or deactivating the various anti-theft means 41 as in the prior art. The second interaction device 22, as illustrated, is connected to the Main Body ECU 4 in parallel with the wireless receiver 31 by tapping signal wires 23 to the signal wires 32. The second interaction device 22 is able to issue signals in a manner identical to those from the wireless receiver 31. For example, the second interaction device 22 is able to issues pulses of the same electrical characteristics and conforming to a protocol required by the Main Body ECU 4. As such, the Main Body ECU 4 could be controlled by the second interaction device 22 as if it is controlled by the wireless receiver 12.

As such, when the driver carrying the first interaction device 21 enters an effective sensing range from the motor vehicle, the second interaction device 22 would detect the presence of the first interaction device 21. The second interaction device 22 then issues appropriate disarming or deactivating signals to the Main Body ECU 4 via the signal wires 23 and 32. As described earlier, the signals would be like those from the wireless receiver 22 and the Main Body ECU 4 would then disarm or deactivate the various anti-theft means 41. On the other hand, when the driver carrying the first interaction device 21 has moved outside the effective sensing range from the motor vehicle, the second interaction device 22 would detect the absence of the first interaction device 21 and instruct the Main Body ECU 4 to arm or activate the various anti-theft means 41. Again, the signals would be like those from the wireless receiver 22 and the Main Body ECU 4 would then arm or activate the various anti-theft means 41.

As described, the interaction system 2 of the present invention provides an auxiliary remote activation and deactivation interface to a motor vehicle's built-in anti-theft system in a non-intrusive manner. The present invention therefore could be seamlessly integrated with any motor vehicle already having a built-in anti-theft system without decoding the wireless signals, or replacing the original wireless receiver. In addition, as the interaction system 2 involves an automatic sensing means such as RFID, there is no need to worry about the wearing off or malfunction from the original wireless transmitter of the built-in anti-theft system.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An auxiliary control method to a motor vehicle having a built-in anti-theft system, said built-in anti-theft system having at least a wireless receiver, a Main Body ECU connected to and controlled by said wireless receiver via a plurality of first signal wires, and a plurality anti-theft means controlled by said Main Body ECU, said method comprising the steps of:

providing a first interaction device and a second interaction device capable of mutually detecting each other, said second interaction device capable of producing control signals in a manner identical to those from said wireless receiver to said Main Body ECU;

connecting said second interaction device to said Main Body ECU in parallel with said wireless receiver by tapping a plurality of second signal wires to said first signal wires; and sending said control signals to said Main Body ECU by said second interaction device to deactivate or activate said anti-theft means when said second interaction device detects that said first interaction device is moved into or out of an effective sensing range from said motor vehicle, respectively.

2. An auxiliary control system to a motor vehicle having a built-in anti-theft system, said built-in anti-theft system having at least a wireless receiver, a Main Body ECU connected to and controlled by said wireless receiver via a plurality of first signal wires, and a plurality anti-theft means controlled by said Main Body ECU, said auxiliary control system comprising:

a first interaction device; and a second interaction device installed in said motor vehicle, said first and second interaction devices capable of mutually detecting each other, said second interaction device capable of producing control signals in a manner identical to those from said wireless receiver to said Main Body ECU, said second interaction device connected to said Main Body ECU in parallel with said wireless receiver by tapping a plurality of second signal wires to said first signal wires;

wherein, when said second interaction device detects that said first interaction device is moved into or out of an effective sensing range from said motor vehicle, said second interaction device sends said control signals to said Main Body ECU to deactivate or activate said anti-theft means, respectively.

3. The auxiliary control system according to claim 2, wherein said first and second interaction devices mutually detect each other by a wireless means.

4. The auxiliary control system according to claim 3, wherein said wireless means is one employing Radio Frequency Identify (RFID).

* * * * *